United States Patent [19]
Grimm, deceased et al.

[11] 3,877,341

[45] Apr. 15, 1975

[54] ULTRA-LIGHTWEIGHT METALLIC THREADED FASTENERS

[75] Inventors: David W. Grimm, deceased, late of Madison, N.J.; by Betty Ann Grimm, executrix, Watchung; Michael F. Mihaly, Madison, both of N.J.

[73] Assignee: Amerace Esna Corporation, New York, N.Y.

[22] Filed: Feb. 26, 1973

[21] Appl. No.: 335,502

[52] U.S. Cl................ 85/32 V; 52/617; 151/41.7; 151/41.75; 10/86 R
[51] Int. Cl. .......................................... F16b 37/02
[58] Field of Search............. 85/32 V, 35; 10/86 R; 151/41.7; 52/617

[56] References Cited
UNITED STATES PATENTS

| 1,855,482 | 4/1932 | McArthur | 85/32 V |
|---|---|---|---|
| 2,252,932 | 8/1941 | Johnson | 85/80 |
| 2,607,447 | 8/1952 | Tuttle | 52/617 |
| 2,720,905 | 10/1955 | Bessom | 151/21 B |
| 2,757,346 | 7/1956 | Lahaye | 85/32 V |
| 3,006,003 | 10/1961 | Johnson | 85/32 V |
| 3,011,743 | 12/1961 | Heath | 248/27 |
| 3,179,143 | 4/1965 | Schultz et al. | 151/41.7 |
| 3,184,353 | 5/1965 | Balamuth et al. | 151/41.73 |
| 3,392,225 | 7/1968 | Phelan | 151/41.7 |
| 3,421,058 | 1/1969 | Berman | 85/32 V |

FOREIGN PATENTS OR APPLICATIONS

| 152,854 | 10/1920 | United Kingdom | 85/32 V |
|---|---|---|---|
| 130,635 | 12/1948 | Australia | 85/32 V |
| 737,502 | 9/1955 | United Kingdom | 151/41.7 |
| 65,479 | 8/1913 | Switzerland | 85/32 V |

*Primary Examiner*—Marion Parsons, Jr.
*Attorney, Agent, or Firm*—Samuelson & Jacob

[57] ABSTRACT

Ultra-lightweight metallic threaded fasteners having a thin-walled tubular body including threaded body portions in which the wall thickness is no greater than the depth of the thread, and effectively unthreaded body portions extending axially along the body for reinforcing the tubular body against axial loading.

8 Claims, 23 Drawing Figures

PATENTED APR 15 1975

ULTRA-LIGHTWEIGHT METALLIC THREADED FASTENERS

The present invention relates generally to threaded fasteners and pertains, more specifically, to ultra-lightweight metallic threaded fasteners for use in applications where a lightweight fastener is desired, but a degree of strength must be maintained.

There are, at present, many areas in which lightweight fasteners find use. For example, the aircraft and aerospace industries make wide use of lightweight fasteners in aircraft and space vehicles where weight is a critical factor. Metallic threaded fasteners are highly desirable in many applications since they provide strength and wear resistance enabling reliable disconnectable assemblies with many reuses. Although many lightweight metallic threaded fasteners have been developed for such applications, there are some areas where even greater savings in weight could be attained with the proper fastener.

It is therefore an important object of the invention to provide ultra-lightweight metallic threaded fasteners having the requisite strength for a wide variety of uses, but possessing a lighter weight structure than fasteners currently available for the same uses.

Another object of the invention is to provide an ultra-lightweight metallic threaded fastener construction which can be adapted to a wide range of fastener types for realizing savings in weight over a broad spectrum of fastener applications.

Still another object of the invention is to provide ultralightweight metallic threaded fasteners which will accept and be compatible with conventional mating threaded fasteners.

A further object of the invention is to provide ultra-lightweight metallic threaded fasteners having a variety of desirable structural features all of which are easily fabricated and provide many advantages in use.

A still further object of the invention is to provide ultra-lightweight metallic threaded fasteners which are easily fabricated in large numbers of uniform quality from conventional, available materials.

The above objects, as well as still further objects and advantages, are attained by the invention which may be described briefly as an ultra-lightweight metallic threaded fastener comprising a thin-walled tubular body including at least one threaded body portion in which the wall thickness is no greater than the depth of the thread therein, and at least one effectively unthreaded body portion unitary with the threaded body portion and extending axially along the body for reinforcing the tubular body against axial loading.

The invention will be more fully understood, while still further objects and advantages will become apparent, in the following detailed description of embodiments of the invention illustrated in the accompanying drawing, in which.

Figure 1:
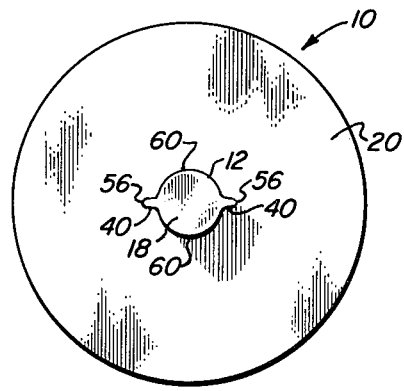
FIG. 1 is a bottom plan view of a threaded fastener in the form of a panel insert constructed in accordance with the invention.
Figure 2:
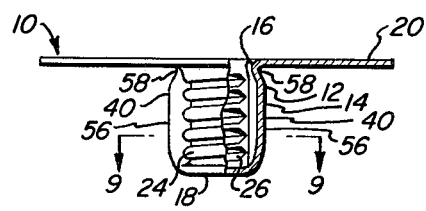
FIG. 2 is a front elevational view, partially sectioned, of the panel insert.
Figure 3:
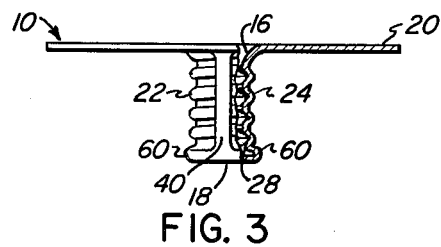
FIG. 3 is a side elevational view, partially sectioned, of the panel insert.

Referring now to the drawings, and especially to FIGS. 1 through 3 thereof, an ultra-lightweight metallic threaded fastener constructed in accordance with the invention is illustrated in the form of a panel insert 10. Insert 10 has a tubular body 12 which includes a relatively thin wall 14 extending in a generally axial direction from a top end 16 to a bottom end 18. A flange 20, unitary with the tubular body 12, projects radially outwardly from the body at the top end 16 thereof. The bottom end 18 is closed. Between the ends 16 and 18 are located two diametrically opposed threaded body portions 22 and 24. Although the threads 26 and 28 of the body portions 22 and 24, respectively, are circumferentially discontinuous, the threads 26 and 28 follow the same helix to establish a single helical thread within the tubular body 12. Multiple helical threads are, of course, possible, with each of such multiple threads extending along a helix which traverses both body portions.

Figure 4:
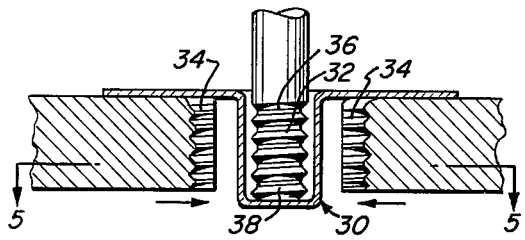
FIG. 4 is an elevational view illustrating a method of making the panel insert.
Figure 6:
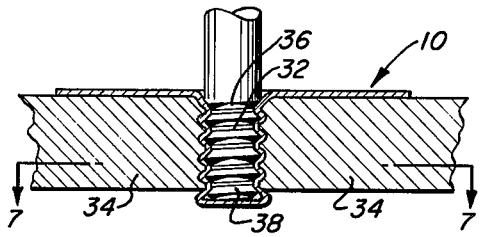
FIG. 6 is an elevational view similar to FIG. 4, but illustrating another step in the method.
Figure 5:
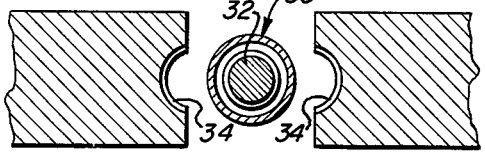
FIG. 5 is a cross-sectional view taken along line 5—5 of FIG. 4.
Figure 7:
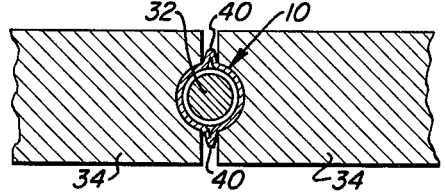
FIG. 7 is a cross-sectional view taken along line 7—7 of FIG. 6.

The threads 26 and 28 preferably are fabricated by deforming the body portions 22 and 24 into an effective threaded configuration. For example, as illustrated in FIGS. 4 through 7, an unthreaded tubular blank 30 having a uniform wall thickness is placed over a threaded mandrel 32, as seen in FIGS. 4 and 5. Diametrically opposed dies 34, each having a thread form, are then advanced radially against the blank 30 and the mandrel 32, as seen in FIGS. 6 and 7, to permanently deform the body portions to establish the desired threads 26 and 28. The mandrel 32 can then be unthreaded from the deformed blank, leaving a configuration as illustrated in FIGS. 1 through 3. At the same time, effectively unthreaded body portions are established at locations circumferentially between the threaded body portions and are shown in the form of diametrically opposed ribs 40 extending axially along the body 12 between the ends 16 and 18 thereof.

Where it is desired to incorporate a self-locking mechanism in the insert 10, a second deforming operation may be performed to deform a part of each threaded body portion 22 and 24 radially inwardly. However, a self-locking mechanism can be established simultaneous with the formation of the threads 26 and 28 in the body portions 22 and 24, thereby eliminating a further operation in the fabrication of an insert with a self-locking mechanism. Thus, the mandrel 32 can be made slightly undersize so that the internal diameter of the threaded body portions 22 and 24 will be small enough to require elastic dilation of the tubular body 12 upon insertion of a complementary threaded member, such dilation establishing a concomitant locking force. In order to assure that at least one undeformed lead-in thread is provided, the mandrel 32 may be tapered from a larger diameter at 36 toward a smaller diameter at 38.

Figure 9:
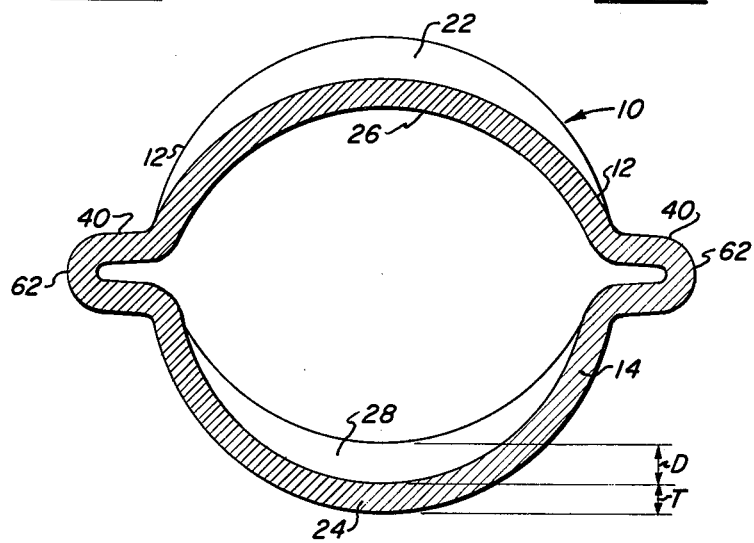
FIG. 9 is an enlarged cross-sectional view taken along line 9—9 of FIG. 2.

In order to attain an ultra-lightweight threaded fastener, the thickness of the material from which insert 10 is fabricated is relatively thin; that is, the wall thickness of each threaded body portion 22 and 24 is no greater than the depth of the thread therein. Thus, as illustrated in FIG. 9, the wall thickness T of each threaded body portion 22 and 24 is less than the thread depth D of the thread 26 and 28 therein. Preferably, the wall thickness is uniform throughout. The following is a tabulation of the depth of thread for typical thread sizes using the American National form of thread and compares the thread depth D to the wall material thickness T for various inserts constructed in accordance with the invention.

| THREAD SIZE AMERICAN NATIONAL | THREAD DEPTH D (in.) | WALL THICKNESS T (in.) |
| --- | --- | --- |
| 6-32 | 0.020 | 0.012 |
| 8-32 | 0.020 | 0.012 |
| 10-32 | 0.020 | 0.012 |
| 10-24 | 0.027 | 0.012 |

As set forth above, the threaded body portions 22 and 24 are circumferentially discontinuous; that is, the threaded body portions are spaced circumferentially from one another, and the effectively unthreaded body portions, which are unitary with the threaded body portions, extend axially along the body in the form of axial ribs 40 located between the threaded body portions 22 and 24. These ribs 40 serve as columns which reinforce the tubular body 12 against axial loading. The term "effectively unthreaded portions," as employed herein to describe the ribs 40, denotes portions which do not form a part of the helical thread provided by threaded portions 22 and 24, but establish the reinforcing columns which enable the threaded portions to withstand axial loading. The term "axial loading" is employed herein to denote axial compression and axial tension arising out of the various forces applied to the fasteners during installation and use and tending to either collapse or expand the thread axially. Hence, even though the wall thickness T is relatively thin, the tubular body 12 is reinforced and given sufficient axial rigidity by virtue of the ribs. Added radial rigidity is provided by the flange 20.

Figure 8:
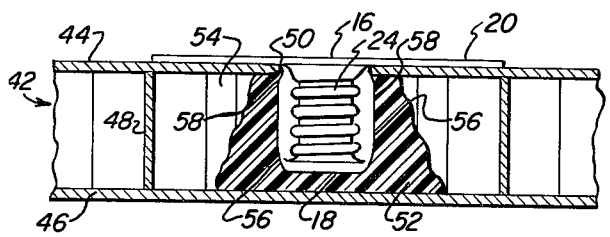
FIG. 8 is a fragmentary cross-sectional view of a panel with the panel insert installed therein.

Referring now to FIG. 8, insert 10 is seen installed within a lightweight panel 42 having a typical construction including top and bottom face sheets 44 and 46, respectively, between which is sandwiched a honeycomb core 48. The insert was installed by first providing an aperture 50 in the top face sheet 44 and then placing a small amount of a hardenable liquid adhesive 52, such as a liquid epoxy resin, in the corresponding cavity 54 within the panel 42. Before the liquid adhesive hardened, the tubular body 12 of the insert 10 was pushed through the aperture 50 and into the liquid adhesive 52 until the flange 20 came to rest upon the top face sheet 44, as shown. Because of the way in which the threads 26 and 28 and the threaded portions 22 and 24 have been formed, the ribs 40 have been provided with a bulge 56 located toward the bottom end 18 of the tubular body 12 so that the radial extent of each rib 40 at the location of a bulge 56 is somewhat greater than the radial extent of indentations 58 formed in the rib portions adjacent the flange 20. Because the aperture 50 has a slightly smaller diameter than the diametric extent of the ribs at the bulges 56, the insert 10 can be snapped through the aperture 50 and will be retained in place, as shown, while the liquid adhesive 52 hardens.

In such an installation, the ribs 40 serve as keys which will prevent rotation of the insert 10 during use of the insert after the liquid adhesive 52 has hardened. While a certain amount of resistance to pull-out of the insert is provided by the external configuration of threaded body portions 22 and 24 and by the above-described configuration of the ribs 40, additional pull-out strength is provided by a radially outwardly extending protuberance 60 in the tubular body 12 located circumferentially between the reinforcing ribs 40 at the bottom end 18 of the tubular body. The protuberance 60 is formed upon fabrication of the threaded body portions 22 and 24, as set forth above, by confining the axial extent of the thread-forming dies to the axial extent of the threads 26 and 28. The portion of the tubular body 12 which is not deformed inwardly to establish the threads 26 and 28 then becomes the protuberance 60. Because the wall thickness of the material of the insert 10 is relatively thin, the flange 20, which now rests upon the top face sheet 44, is also very thin and provides an almost flush mounted insert.

As best seen in FIG. 9, the ribs 40 have a generally U-shaped cross-sectional configuration as viewed in a radial plane, the bottom of the U-shaped configuration being at the radially outermost edge 62 of the rib. Such a configuration provides an effective column for reinforcing the tubular body portion against axial loading during installation and use of the insert.

Figure 10:
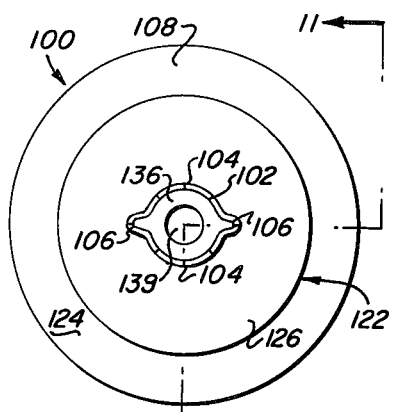
FIG. 10 is a bottom plan view of another threaded fastener in the form of a panel insert constructed in accordance with the invention.
Figure 12:
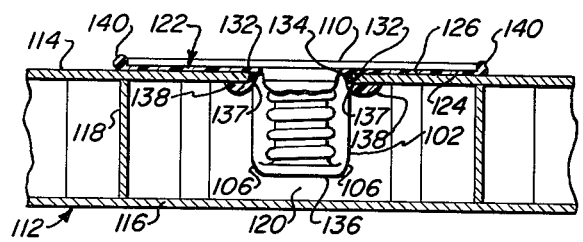
FIG. 12 is a fragmentary cross-sectional view of a panel with the panel insert of FIGS. 10 and 11 installed therein.
Figure 11:
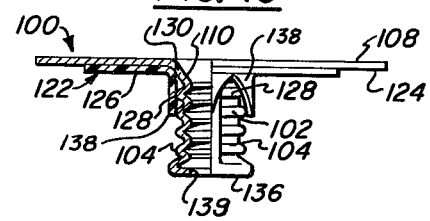
FIG. 11 is a partial cross-sectional view of the panel insert of FIG. 10 taken along line 11—11 of FIG. 10.
Figure 13:
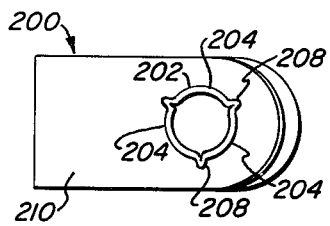
FIG. 13 is a plan view of a threaded fastener in the form of a clip-nut constructed in accordance with the invention.
Figure 14:
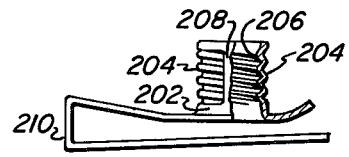
FIG. 14 is an elevational view, partially sectioned, of the clip-nut.
Figure 15:
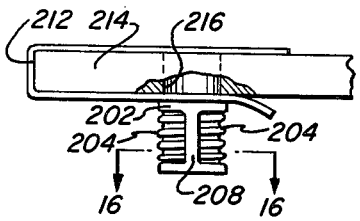
FIG. 15 is a fragmentary elevational view showing the clip-nut installed at the edge of a plate.

Referring now to FIGS. 10 through 12, another ultra-lightweight metallic threaded fastener constructed in accordance with the invention is illustrated in the form of a panel insert 100. Insert 100 is similar to insert 10 in that insert 100 has a thin-walled tubular body 102 including diametrically opposed threaded body portions 104 and diametrically opposed reinforcing ribs 106 and a radially extending flange 108 at one end 110 thereof. As best seen in FIG. 12, insert 100 is also installed in a lightweight panel 112 which includes top and bottom face sheets 114 and 116, respectively, between which is sandwiched a honeycomb core 118. However, in this instance, adhesive is not placed in the cavity 120 in which the tubular body 102 of the insert 100 is to be placed. Instead, insert 100 is provided with an adhesive element, preferably in the form of a member 122 of thermoplastic synthetic resin material juxtaposed with the flange 108 and contiguous with the lower surface 124 thereof. The member 122 of thermoplastic synthetic resin material includes an annular disk portion 126 extending along the lower surface 124 of the flange 108 and an inner tubular portion 128 depending from the annular disk portion 126 and extending axially contiguous with corresponding portions 130 of the tubular body 102. Preferably, the depending portion 128 is divided into axially extending projections in the form of flaps 132 resiliently biased against portions 130 to grip portions 130 and retain the member 122 in place upon insert 100.

Insert 100 is installed within the panel 112 by pushing the tubular body 102 through a corresponding aperture 134 provided in the top face sheet 114, as seen in FIG. 12, and then heating the insert and the member 122 of thermoplastic synthetic resin material until the member melts and flows. When the member 122 is melted and flows sufficiently fo provide a film of melted synthetic resin material between the flange 108 and the top face sheet 114, a visual indication will be provided in the form of a bead 140 of synthetic resin material extending beyond the outer periphery of flange 108. Observation of the bead 140 will indicate that sufficient melting has taken place for proper bonding between the flange and the top face sheet. Upon cooling of the member 122, the member will harden and adhere the flange 108 to the top face sheet 114, thereby adhering the insert 100 in place within the panel 112. The flaps 132 will tend to fill the space between the aperture 134 and the portions 130 of the tubular body 102 adjacent the flange 108, including the indentations 137, and will form integral anchors 138 which will coact with the peripheral edge of aperture 134 so as to further secure the insert within the panel. The thin material of flange 108, when bonded to sheet 114, enables the flange to bend with the sheet so that the bond between the flange and the sheet will not break loose upon flexing of the panel and the sheet. It is noted that, in this instance, a liquid adhesive is not employed as is the case with the embodiment of FIGS. 1 through 3. Thus, the bottom end 136 of the insert may be open at 139 rather than closed as in the earlier described embodiment.

Figure 16:
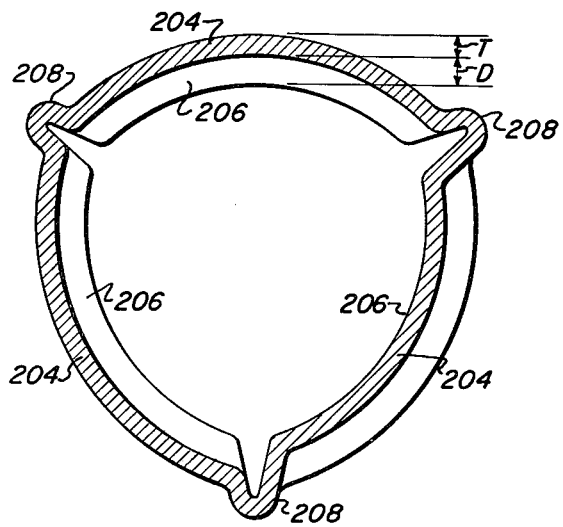
FIG. 16 is an enlarged cross-sectional view taken along line 16—16 of FIG. 15.

Turning now to FIGS. 13 through 16, another embodiment of the invention is illustrated in the form of a clip-nut 200 having a thin-walled tubular body 202 including three circumferentially equidistant threaded body portions 204 in which the wall thickness T is no greater than the depth D of the thread 206 therein. Located circumferentially between the threaded body portions 204 are three unthreaded body portions illustrated in the form of ribs 208 extending axially along the body 202 for reinforcing the tubular body against axial loading. As best seen in FIG. 16, the wall thickness T is somewhat less than the thread depth D of each threaded body portion 204. The ribs 208 have a generally U-shaped cross-sectional configuration and are spaced apart circumferentially 120° from one another. Because the ribs 208 are not diametrically opposed, the possibility of the occurrence of cross-threading during the engagement of a complementary, mating externally threaded element is lessened in comparison to the two-ribbed configuration illustrated in the embodiments of FIGS. 1 through 12. Hence, the three-ribbed configuration, while providing circumferentially shorter thread segments, provides the advantage of reduced risk of cross-threading. In addition, the increased number of reinforcing ribs 208 provides greater strength against axial loading. The advantages of increasing the number of reinforcing ribs must be weighed against the disadvantages of the decreased circumferential extent of the body portions available for threading.

In the instant embodiment, a clip 210 is provided integral with the tubular body 202 at one end thereof for enabling the tubular body to be affixed to the edge 212 of a plate 214 so as to provide threads adjacent an aperture 216 in the plate for receiving a mating externally threaded fastener.

Figure 17:
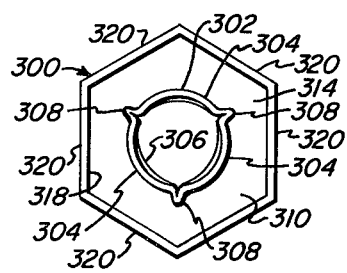
FIG. 17 is a top plan view of a threaded fastener in the form of a nut with a hexagonal wrenching configuration constructed in accordance with the invention.
Figure 18:
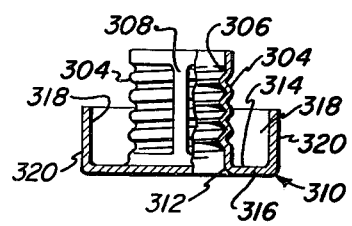
FIG. 18 is an elevational view, partially sectioned, of the nut of FIG. 17.

Referring now to FIGS. 17 and 18, a further embodiment of the invention is illustrated in the form of a nut 300. The nut 300 includes a thin-walled tubular body 302 having three threaded body portions 304 in which the wall thickness is no greater than the depth of the thread 306 therein and three unthreaded body portions unitary with the threaded body portions and establishing ribs 308 extending axially along the body 302 for reinforcing the tubular body against axial loading. A flange 310 is unitary with one end 312 of the tubular body and includes a radially extending portion 314 for providing a clamping surface 316 and an axially extending portion 318 for providing a wrenching configuration. In this instance, the wrenching configuration is a hexagonal wrenching configuration providing six wrenching faces 320. Although it is feasible to employ a special wrench which will grip the radially projecting ribs 308 to perform the wrenching function, a special wrench is not required where a standard wrenching configuration, such as that of the embodiment of FIGS. 17 and 18, is provided.

Figure 19:
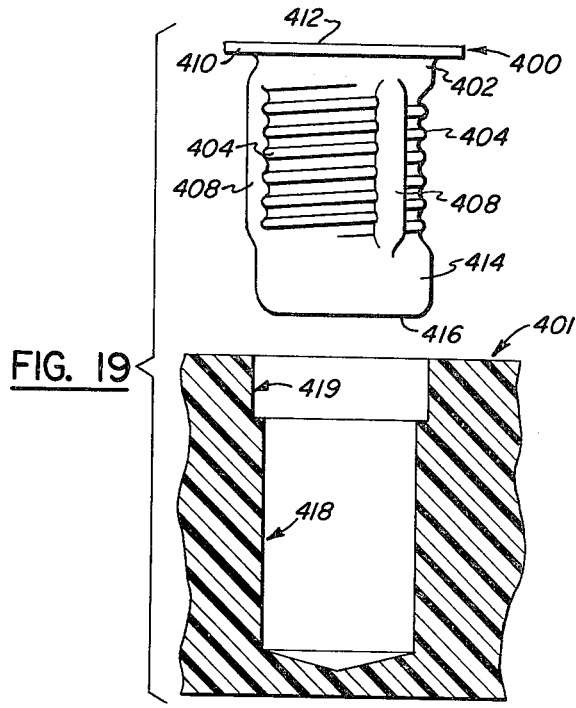
FIG. 19 is an elevational view of a threaded fastener in the form of an insert constructed in accordance with the invention for providing metallic threads in a thermoplastic member shown in section.
Figure 20:
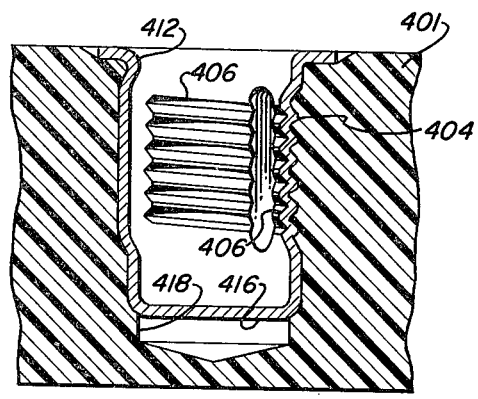
FIG. 20 is an elevational cross-sectional view of the insert of FIG. 19 installed in the thermoplastic member.

Referring now to FIGS. 19 and 20, still another embodiment of the invention is illustrated in the form of an insert 400 for providing metallic threads in a structural member 401 of thermoplastic material. Insert 400 is a generally cup-shaped insert having a thin-walled tubular body 402 including three threaded portions 404 in which the wall thickness is no greater than the depth of the thread 406 therein and three effectively unthreaded body portions, shown in the form of ribs 408 unitary with the threaded body portions 404, extending axially along the body 402 for reinforcing the tubular body against axial loading. A unitary flange 410 projects radially from one end 412 of the tubular body 402 and an unthreaded sleeve 414 extends axially between the threaded portions 404 and the other end 416 of the body. It is noted that the threaded portions 404 are deformed radially inwardly relative to the sleeve 414 while the ribs 408 are deformed radially outwardly relative to the sleeve 414.

The insert 400 is installed within the structural member 401 of thermoplastic material by first providing a bore 418 and counterbore 419 in the member. The bore 418 has a diameter slightly smaller than the diameter of the sleeve 414 while the counterbore 419 has a diameter complementary to the diameter of the sleeve 414. The sleeve can then serve as the pilot for locating the insert 400 within the counterbore 419. By vibrating the insert 400 at an ultrasonic frequency in an axial direction, the thermoplastic material in the vicinity of the insert will soften locally to admit the insert and will conform generally to the external configuration of the insert so that the insert may be advanced into the bore and located as illustrated in FIG. 20. Subsequent hardening of the thermoplastic material will anchor the insert 400 in place. In such installations, inserts have been vibrated at a frequency of 20 kHz and it has been found that the thermoplastic material at the interface between the insert 400 and the thermoplastic member 401 will conform to the external configuration of the insert and secure the insert in place. Alternately, insert 400 may be molded directly in a structural member of thermoplastic material.

Figure 21:
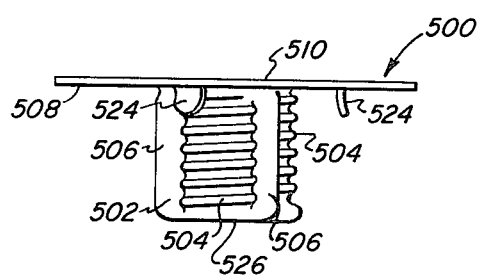
FIG. 21 is an elevational view of a threaded fastener in the form of another insert constructed in accordance with the invention.
Figure 22:
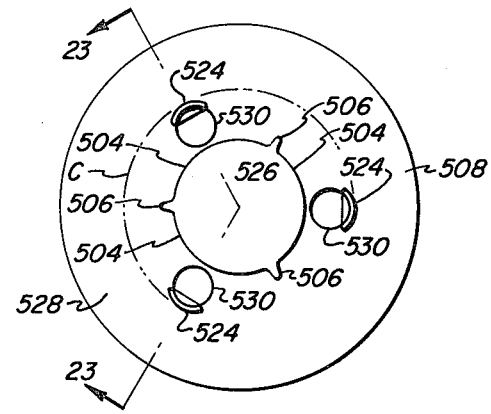
FIG. 22 is a bottom plan view of the insert of FIG. 21.
Figure 23:
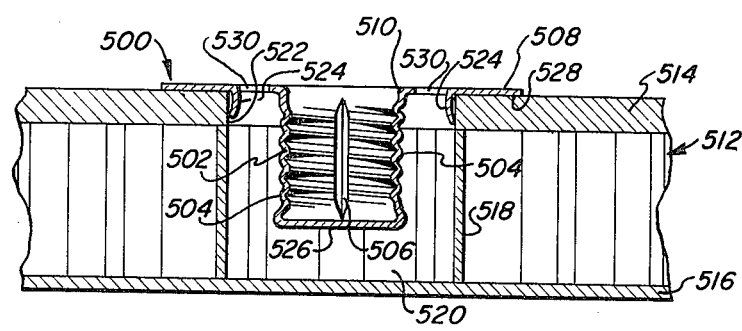
FIG. 23 is a fragmentary cross-sectional view of a panel with the panel insert of FIG. 21 installed therein and sectioned along line 23-23 of FIG. 22.

Turning now to FIGS. 21 through 23, another embodiment of the invention is illustrated in the form of a panel insert 500. Insert 500 has a thin-walled tubular body 502 including three threaded body portions 504 and three reinforcing ribs 506, and a radially extending flange 508 at one end 510 thereof.

As best seen in FIG. 23, insert 500 is installed in a lightweight panel 512 which includes top and bottom face sheets 514 and 516, respectively, between which is sandwiched a honeycomb core 518. In this instance, an oversize cavity 520 is formed in the core 518 through an oversize aperture 522, the term "oversize" being employed to describe the much larger diameter of the aperture 522 and the cavity 520 relative to the corresponding overall outside diameter of the tubular body 502. Such an oversize cavity may be used in order to open up more cells within the honeycomb core 518 for the reception of a hardenable liquid adhesive so as to provide greater holding ability resulting from effectively increasing the areas of contact between the liquid adhesive and the honeycomb core.

In order to accurately position the insert 500 within the aperture 522, the flange 508 is provided with an overall diameter greater than the diameter of the aperture 522 and a plurality of tabs 524 are located on the flange at radial locations intermediate the overall diameter of the flange 508 and the overall outside diameter of the tubular body 502. The tabs 524 project downwardly toward the other end 526 of the insert and lie along a circle C having a diameter corresponding to the diameter of the aperture 522 so that the tabs 524 will engage the peripheral edge of the aperture to position insert 500 within the aperture while the insert is supported by the portion 528 of the flange 508 which extends radially beyond circle C.

It is noted that the tabs 524 are actually comprised of portions of the flange 508 which have been pierced from the flange and deformed axially downwardly toward end 526 of the insert, leaving openings 530 in the flange contiguous with the tabs. These openings 530 preferably are located so that at least a portion thereof lies within circle C to attain communication between the openings 530 and the cavity 520. Such communication allows liquid adhesive to be injected into the cavity through one opening 530 while another of the openings 530 serves as a vent to enable air to escape from the cavity 520 as the cavity is filled with adhesive. By the proper formation and location of tabs 524, the tabs can serve as resilient gripping members to coact with the peripheral edge of the aperture 522 and retain the insert 500 within the aperture 522 by a press fit. Alternately, or in addition, a thermoplastic adhesive member can be employed in connection with the underside of portion 528 of flange 508, in a manner similar to that described in connection with insert 100.

It will be seen that each of the embodiments described above provides the advantages of metallic threads in installations where such threads are desired, but makes such a provision with minimal added weight. Hence, the embodiments provide ultralightweight metallic threaded fasteners.

It is to be understood that the above detailed description of various embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. An ultra-lightweight metallic threaded fastener comprising:
   a thin-walled tubular body including
   a radially extending flange at one end of the tubular body;
   threaded body portions in which the wall thickness is no greater than the depth of the thread therein;
   effectively unthreaded body portions unitary with the threaded body portions and extending axially along the body for reinforcing the tubular body against axial loading, the unthreaded body portions including at least two reinforcing ribs projecting radially outwardly beyond the radial extent of the threaded body portions and extending axially between the flange and the opposite end of the tubular body;
   the radial extent of each rib being greatest at a location spaced axially from the flange toward said opposite end and decreasing between said location and the flange to provide an indentation adjacent the flange; and
   a radially outwardly extending protuberance in the tubular body located circumferentially between the reinforcing ribs at said opposite ends.

2. The invention of claim 1 wherein each rib has a generally U-shaped cross-sectional configuration as viewed in a radial plane, the bottom of the U-shaped configuration being at the radially outermost extent of the rib.

3. The invention of claim 1 including at least three threaded body portions and three reinforcing ribs.

4. The invention of claim 3 wherein each rib has a generally U-shaped cross-sectional configuration as viewed in a radial plane, the bottom of the U-shaped configuration being at the radially outermost extent of the rib.

5. The invention of claim 1 wherein the wall thickness of the unthreaded body portions are essentially the same as the wall thickness of the threaded body portions.

6. The invention of claim 1 including
a radially extending surface on said flange facing the opposite end of the tubular body; and
a member of thermoplastic synthetic resin material juxtaposed with the flange contiguous with said surface thereof.

7. The invention of claim 6 wherein the said member includes an annular disk portion extending along said surface and an integral generally tubular portion contiguous with at least a corresponding portion of the tubular body adjacent the flange.

8. The invention of claim 7 wherein said integral generally tubular portion of the member of thermoplastic synthetic resin material is divided into a plurality of axial projections.

* * * * *